United States Patent [19]

Prata et al.

[11] Patent Number: 5,654,700
[45] Date of Patent: *Aug. 5, 1997

[54] DETECTION SYSTEM FOR USE IN AN AIRCRAFT

[75] Inventors: Alfredo Jose Prata, Eliza Heights; Ian James Barton, Blackrock, both of Australia

[73] Assignee: Commonwealth Scientific and Industrial Research Organization, Australia

[*] Notice: The term of this patent shall not extend beyond the expiration date of Pat. No. 5,602,543.

[21] Appl. No.: 487,966

[22] Filed: Jun. 7, 1995

Related U.S. Application Data

[62] Division of Ser. No. 941,044, filed as PCT/AU91/00132, Apr. 9, 1991, Pat. No. 5,602,543.

[30] Foreign Application Priority Data

Apr. 9, 1990 [AU] Australia ................ PJ9518

[51] Int. Cl.[6] ........................ G08B 23/00
[52] U.S. Cl. ............ 340/963; 250/339.14; 356/418; 340/601
[58] Field of Search ............ 340/968, 963, 340/601; 250/342, 388.1, 339.01, 339.14, 372; 356/438, 418, 342

[56] References Cited

U.S. PATENT DOCUMENTS

| | | | |
|---|---|---|---|
| 3,641,345 | 2/1972 | Coackley et al. | 250/339.14 |
| 3,931,521 | 1/1976 | Cinzori | 250/339.15 |
| 3,973,118 | 8/1976 | LaMontagne | 250/339.02 |
| 4,126,396 | 11/1978 | Hartmann et al. | 356/418 |
| 4,233,596 | 11/1980 | Okamoto et al. | 250/339.15 |
| 4,266,130 | 5/1981 | Kuhn | 250/339.14 |
| 4,363,967 | 12/1982 | Efkeman et al. | 250/339.14 |
| 4,390,785 | 6/1983 | Faulhaber et al. | 250/339.14 |
| 4,409,483 | 10/1983 | Turley | 250/339.14 |
| 4,725,733 | 2/1988 | Horman et al. | 250/339.14 |
| 4,999,498 | 3/1991 | Hunt et al. | 250/338.1 |

*Primary Examiner*—Brent A. Swarthout
*Attorney, Agent, or Firm*—Blakely Sokoloff Taylor & Zafman

[57] ABSTRACT

A detection system for use in an aircraft which is able to monitor atmospheric conditions ahead of the aircraft, generate an alarm signal if adverse atmospheric conditions exist ahead of the aircraft and generate information which indicates the position of the adverse conditions so the adverse conditions can be avoided. The system is able to detect the presence of volcanic ash cloud ahead of the aircraft and, if desired, can also be used to detect a high density of sulphur dioxide gas and/or clear air turbulence ahead of the aircraft. The system monitors infrared radiation received by the aircraft, generates intensity signals representative of at least one predetermined wavelength of the radiation and compares intensity signals with reference signals or intensity signals of another infrared wavelength. If the results of the comparison indicate the adverse conditions are present, an adverse condition warning signal is generated and the device is also able to generate video display signals for producing a video display which indicates the position of the adverse conditions relative to the aircraft.

20 Claims, 13 Drawing Sheets 5,654,700

DETECTION SYSTEM FOR USE IN AN AIRCRAFT

This is a division of application Ser. No. 07/941,044, filed as PCT/AU91/00132, Apr. 9, 1991, now U.S. Pat. No. 5,602,543.

FIELD OF THE INVENTION

The present invention relates to a detection system for use in an aircraft and, more specifically, to a detection system of an aircraft which is able to detect the presence of a volcanic ash cloud.

BACKGROUND OF THE INVENTION

Volcanic ash clouds constitute a serious hazard to aircraft even after the clouds have moved from the site of a volcanic eruption. Apart from containing ash particles, the clouds include gases such as $SO_2$, which after a few days oxidises and hydrolises to form sulphuric acid droplets, either as an ash-acid mixture or as a coating over ash particles. Both the ash particles and the sulphuric acid droplets of volcanic ash clouds are capable of causing significant damage to and possible loss of an aircraft which encounters an ash cloud.

A number of aircraft encounters with volcanic ash clouds have been recorded in the past where significant damage has occurred. Between April and July 1982 Galunggung, a volcano in Central Java, Indonesia, underwent a series of eruptions. The dispersing ash clouds, in moving across commercial flight paths, constituted a major hazard because the radar systems of aircraft were, and still are, unable to discriminate between ash clouds and ice/water clouds. Also a volcanic ash cloud normally can not be distinguished visually from a grey ice/water cloud. Two major incidents resulted from aircraft flying directly into the ash clouds. On 24 Jun. 1982, a British Airways Boeing 747, flying from Kuala Lumpur in Malaysia to Perth, entered an ash cloud. All four engines stalled and the aircraft descended 6000 m without power before attempts to restart the engines succeeded. An emergency landing was made at Jakarta, Indonesia. A second incident occurred on 13 Jul. 1982 when a Singapore Airlines Boeing 747 suffered similar inflight problems and again an emergency landing was made at Jakarta. More recently, on 15 Dec. 1989, a KLM Boeing 747 encountered an ash cloud produced by an eruption of the Mount Redoubt Volcano in Alaska, USA. The engines of the aircraft stalled and the jet descended 3600 m without power. Furthermore, the cockpit of the aircraft was reported to have filled with sulphur smelling gases. The descriptions of the encounter were remarkably similar to the Galunggung ash cloud encounters and the effects on the aircraft were also similar.

The above serves to illustrate the requirement for a detection system which could provide a pilot with early warning of the presence of an ash cloud so the cloud can be avoided. A system relying on data collected from satellites could be implemented, however, satellite data for a particular area of the earth's atmosphere is only updated periodically. For example, data from satellites in a polar orbit is only provided four times a day for most regions of the earth. Therefore a detection system which can be installed in an aircraft to monitor conditions ahead of the aircraft is desired. Furthermore, it would be advantageous if the system could also detect other adverse atmospheric conditions, such as a clear air turbulence, which can not be detected visually or by known aircraft detection systems, and should be avoided by aircraft.

SUMMARY OF THE INVENTION

In accordance with the present invention there is provided a detection system for use in an aircraft, comprising means for monitoring atmospheric conditions ahead of said aircraft, generating an alarm signal if adverse atmospheric conditions exist ahead of said aircraft, and generating information which indicates the position of said adverse conditions so the adverse conditions can be avoided.

The adverse conditions may comprise a volcanic ash cloud, a high density of sulphur dioxide gas and/or clear air turbulence.

The present invention further provides a detection system for an aircraft, comprising means for detecting the presence of a volcanic ash cloud ahead of said aircraft, and means for alerting a pilot of said aircraft to the presence of said cloud.

Preferably said detection system includes means, responsive to detection of said ash cloud, for generating information representative of the position of said ash cloud relative to said aircraft. Preferably said alerting means system includes means for generating display signals for producing a display of said information.

Preferably said detecting means is also able to detect the presence of sulphur dioxide and/or clear air turbulence.

Preferably said detecting means and alerting means include means for monitoring infrared radiation received by said aircraft, filter means for generating intensity signals representative of the intensity of predetermined wavelengths of said radiation, and processing means for comparing the intensity signals of two of said predetermined wavelengths and generating a volcanic ash cloud warning signal if the results of the comparison indicate an ash cloud is present.

Preferably said warning signal is generated if said intensity signals indicate radiation received of the longer wavelength is less than radiation received of the shorter wavelength.

Preferably said monitoring means an infrared detector array and said intensity signals relate to pixels of said array, such that intensity signals of each of said predetermined wavelengths correspond to each one of said pixels and said processing means generates display signals representative of the position of said ash cloud relative to said aircraft on the basis of said intensity signals and position signals representative of the position of said aircraft. Preferably said display is generated when said processing means determines said ash cloud is present.

The present invention also provides a method of detecting adverse atmospheric conditions, comprising monitoring infrared radiation received by an aircraft, generating signals representative of the intensity of at least one predetermined wavelength of said radiation, processing the intensity signals, and generating a warning signal if said intensity signals indicate said adverse conditions are present.

Preferably said warning signal is generated if a value of signals for the longer wavelength is less than a value of signals for the shorter wavelength.

Preferably said signals relate to pixels of an infrared detector array, and said method further includes generating a display of the position of said adverse conditions relative to said aircraft on the basis of said signals.

The present invention further provides an aircraft comprising a detection system as described above.

Preferably said longer wavelength is approximately 12 µm and the shorter wavelength is approximately 10 µm. Preferably the predetermined wavelengths include two further wavelengths, 6 μm which relates to the detection of clear air turbulence and 9 μm which relates to detection of sulphur dioxide.

BRIEF DESCRIPTION OF THE DRAWINGS

A preferred embodiment of the present invention will now be described, by way of example only, with reference to the accompanying drawings, wherein.

DESCRIPTION OF THE PREFERRED EMBODIMENT

Figure 1:
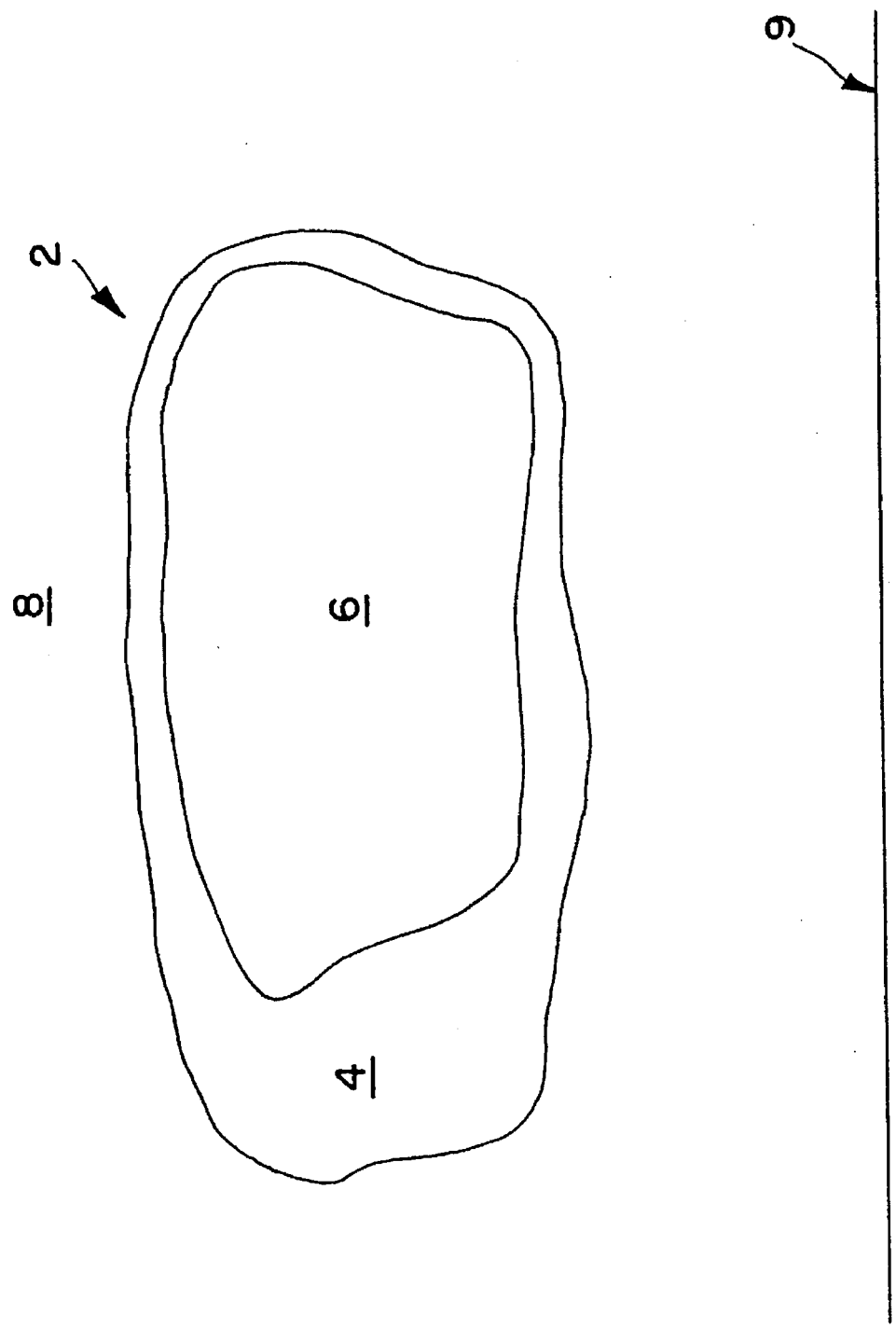
FIG. 1 is a diagram of a volcanic ash cloud.

Infrared radiometers mounted on satellites have provided a significant amount of data in relation to infrared radiation emitted from the earth's surface, and absorbed by clouds, over a range of infrared wavelengths. The satellites include the TIROS-N/NOAA polar orbiting satellites and the Geostationary Meteorological Satellites (GMS). Analysis of the data has confirmed volcanic ash clouds have a characteristic infrared signature which enables them to be distinguished from normal ice/water clouds. A volcanic ash cloud 2, as shown in FIG. 1, when viewed from a satellite, includes a semi-transparent region 4, which in most instances is disposed around the periphery of the cloud 2 about a more dense centre region 6 which generally absorbs all infrared radiation emitted from the earth's surface. The infrared semi-transparent region 4, has been shown to exhibit a "reverse absorption effect", which does not occur in similar regions of ice/water clouds. The effect causes an increase in the infrared radiation received by the satellite for the region 4 for longer or increased infrared wavelengths, between 10 μm and 13 μm. For similar semi-transparent regions of ice/water clouds the intensity of radiation received by the satellite decreases for increasing or longer wavelengths in the 10 to 13 μm range. The radiometers of the satellites include a single detector element which is mounted on a mechanical scanning device so a video display can be produced of the area scanned using the infrared intensity signals generated by the radiometer. For the background 8, which in this case is the earth's surface, and the centre region 6, the absolute value for a brightness temperature corresponding to the radiation received at a selected wavelength can be used to generate the colour displayed. For example, the background 8 would appear a shade of blue and the centre region 6 a shade of black. To highlight the existence of the ash cloud 2, if the difference between the radiation received for a long wavelength and a short wavelength in the 10 to 13 μm range is positive, the semi-transparent region 4 would be displayed a shade of red, according to the magnitude of the difference. If the difference is negative a different colour can be displayed to indicate the cloud is simply an ice/water cloud. Satellite information, however, as discussed previously for a particular area is only updated intermittently and a volcanic ash cloud may move significantly before the information is updated.

A preferred embodiment of a detection system according to the present invention, as described in detail hereinafter with reference to FIGS. 3 to 7, is mounted on an aircraft and monitors infrared radiation ahead of the aircraft. An aircraft, inflight, is normally directed towards space above the horizon 9 of the earth, as shown in FIG. 1. When viewing a cloud 2 and monitoring the infrared radiation received therefrom, the background 8 is space and not the surface of the earth as is the case for satellite radiometers, and it has been found an opposite effect occurs to the reverse absorption effect discussed above.

Figure 2:
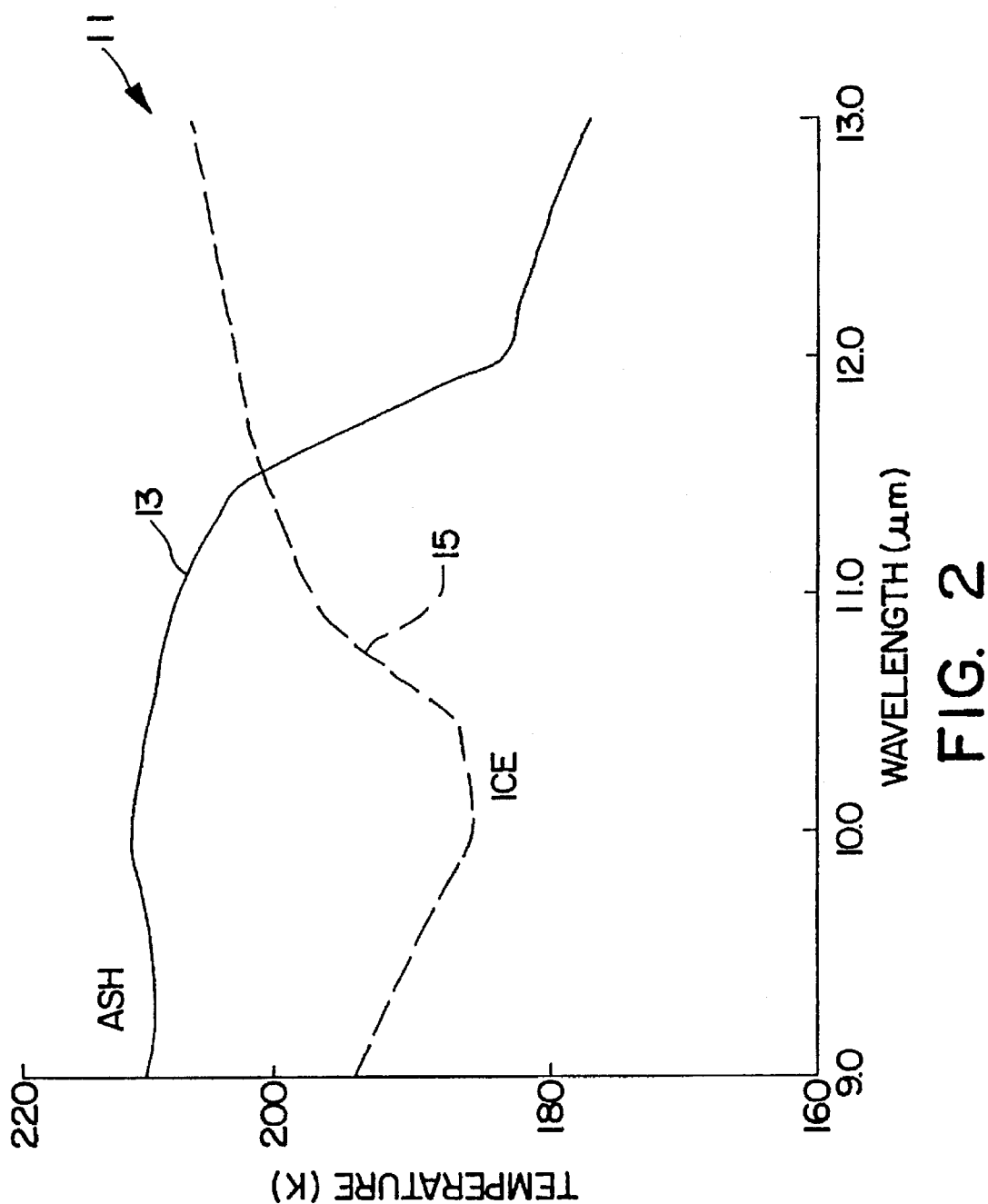
FIG. 2 is a graph of infrared radiation received from ice/water clouds and volcanic ash clouds vs infrared wavelength.

A graph 12 of infrared radiation received from a cloud 2 when viewed horizontally from the aircraft vs wavelength of the radiation is illustrated in FIG. 2. In the graph 12 the radiation intensities have been converted to corresponding brightness temperatures. For the 9 to 13 μm range, infrared radiation received is approximately directly proportional to the corresponding brightness temperature. Two curves are illustrated in the graph 11, one curve 13 relating to infrared radiation received from the semi-transparent region 4 of a volcanic ash cloud, and the other curve 15 relating to the radiation received from the semi-transparent region 4 of a cloud containing ice particles. The graph 11 illustrates the opposite effect which occurs in that for the semi-transparent region 4, the infrared radiation received decreases with respect to increasing wavelength in the 10 to 13 μm region for ash clouds, whereas radiation received increases with respect to increasing wavelength for ice clouds. A cloud containing water droplets would behave in a similar manner to a cloud containing ice particles. The opposite effect is believed to occur because an aircraft views clouds ahead against a relatively cold background 8, such as space, whereas a satellite radiometer views clouds against a relatively warm background, the earth's surface. According to the graph 11, the difference between radiation received for two wavelengths within the 10 to 13 μm region is greatest for 10 μm and 12 μm. By analysing the difference between radiation intensities received at 10 to 12 μm as brightness temperature readings, the detection system is able to distinguish between ice/water clouds and volcanic ash clouds. If the difference between 12 μm brightness temperatures and 10 μm brightness temperatures is negative this indicates the presence of a volcanic ash cloud, whereas if the difference is positive, an ice/water cloud is present. The differences will only occur for radiation received from the semi-transparent region 4 of a cloud 2. Radiation received from the dense centre region 6 of a cloud 2 and the background 8 will be substantially the same for 10 μm and 12 μm.

The existence of sulphuric acid droplets and particles in a cloud 2 also effects the radiation received in the same manner as for ash clouds. A negative difference between the 12 and 10 μm readings therefore indicates the presence of an ash cloud or/and a cloud containing sulphuric acid droplets or particles. Furthermore, the level at which sulphur dioxide absorbs infrared radiation varies with respect to the wavelength of the radiation, and maximum absorption occurs at 8.6 μm. Therefore, by also monitoring infrared radiation received at 8.6 μm, the detection system is able to detect increased levels of sulphur dioxide in the atmosphere, which can be used to confirm the presence of a volcanic ash cloud.

The detection system is also able to detect the presence of clear air turbulence by measuring infrared emission from water vapour anomalies in the upper troposphere. The anomalies occur due to turbulent motions in the troposphere which transport water vapour rich air upwards into layers which are otherwise dry. The presence of the moist layers can be detected by examining the difference between the 12 μm radiation and 6.3 μm radiation received by an aircraft. If the difference exceeds a predetermined threshold, the existence of clear air turbulence can be inferred.

Figure 3:
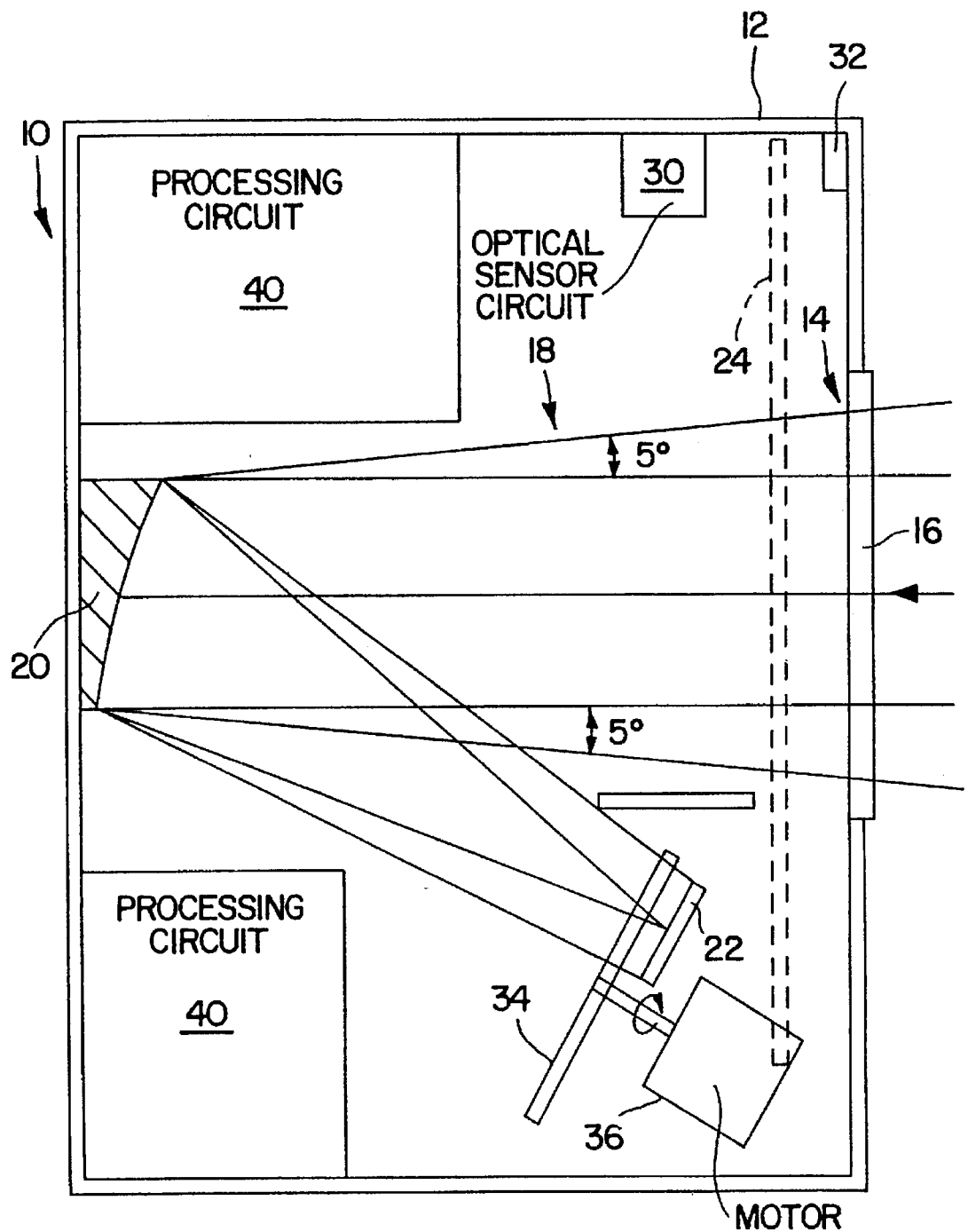
FIG. 3 is a schematic side view of a preferred embodiment of a detection unit of a system according to the present invention.
Figure 4:
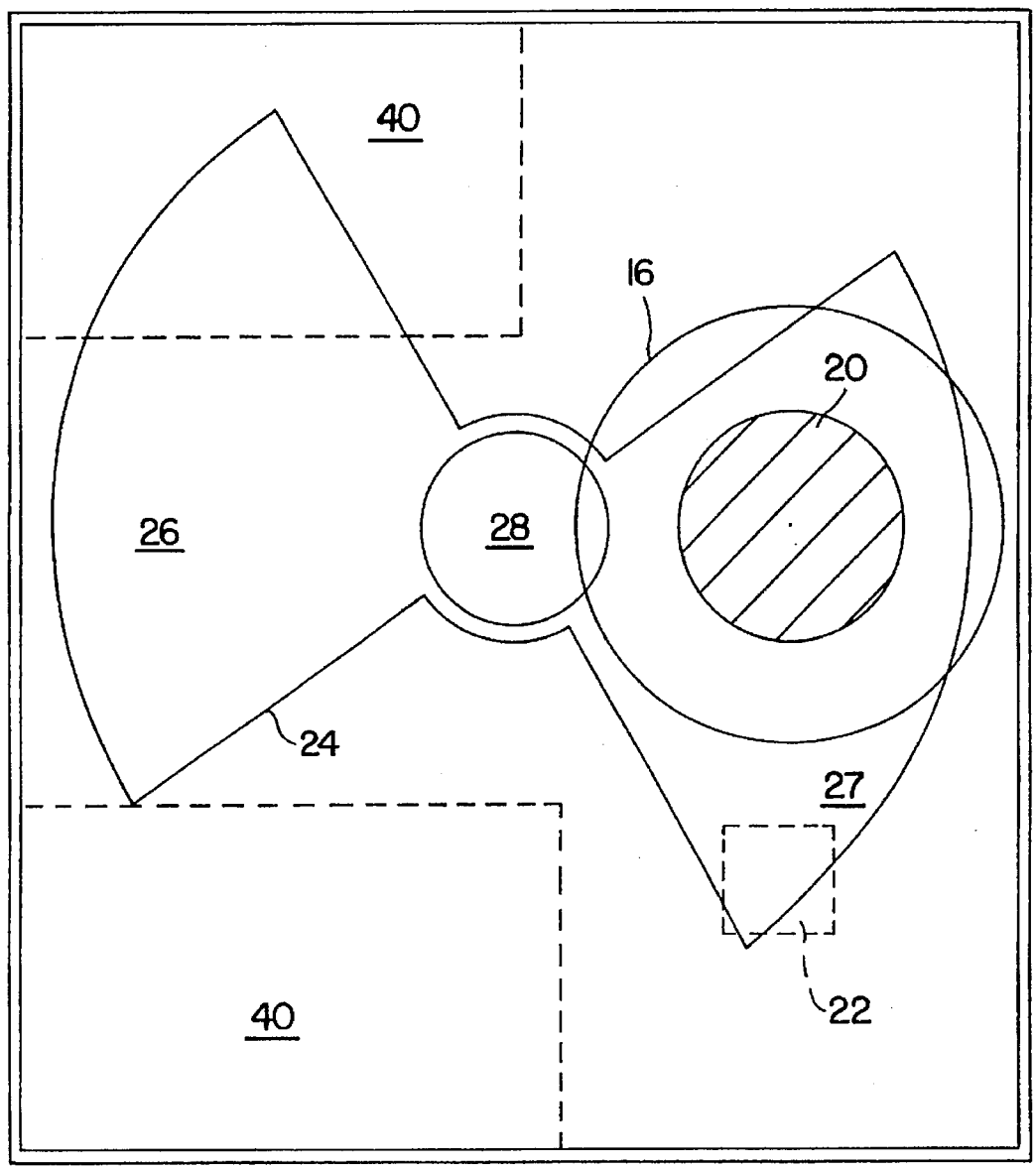
FIG. 4 is a schematic front view of the unit.

The detection system includes a detection unit 10, as shown in FIGS. 3 and 4, which is housed in an opaque casing 12. The casing 12 has an opening 14, which includes an infrared transmissive window 16. The window 16, which is preferably an IRTRAN-2 window or similar, only allows infrared radiation within a predetermined wavelength range to enter the casing 12. The predetermined range includes the wavelengths of interest, 6.3, 8.6, 10 and 12 μm. The window 16 transmits received radiation 18 onto an offset paraboloid reflector 20 mounted on an opposite wall of the casing 12 from the window 16, as shown in FIG. 3. The reflector 20 reflects and focuses the radiation 18 onto a detector array 22. The array 22 includes 256×256 HgCdTe infrared detector elements. The detector elements each generate signals which can be used to produce a pixel in a video display. The array 22 eliminates the need for any form of mechanical scanning apparatus.

The unit 10 is mounted onto an aircraft, preferably in the nose of the aircraft, so the window 16 is directed towards the field of view ahead of the aircraft. The detector array 22 will then receive an infrared image of the field of view ahead of the aircraft of ±5° in the horizontal and vertical planes. The image received by the array 22 the represents an area of 17.5 km² 100 km from aircraft. The detector array 22 is cooled to maximise its sensitivity to infrared radiation.

The unit 10 includes a chopper propeller 24, as shown in FIGS. 3 and 4, which includes two oppositely disposed blades 26 and 27, and is rotated at a frequency of 50 Hz by a chopper motor 28. The angle between the opposite sides of each blade 26 and 27 is 90° and as the chopper 24 is rotated the blades intermittently prevent radiation from the window 16 from being received by the reflector 20, and in turn the array 22. Instead, when a blade 27, as shown in FIG. 4, is disposed between the window 16 and the reflector 20, the array 22 only receives the radiation of the chopper 24. The chopper 24 therefore modulates the atmospheric radiation received by the array 22 from the window 16 at a frequency of 100 Hz. Modulation of the atmospheric radiation causes the signals generated by the array 22 to be in the form of amplitude modulated signals having a 100 Hz carrier which is modulated in accordance with the intensity of the atmospheric radiation 18. Signals representative of the received radiation are extracted from the modulated signals using a synchronous detector, as described hereinafter with reference to FIG. 6. Modulation of the received radiation 18 by the chopper 24 enables electrical signals to be derived which are only representative of the received infrared radiation and do not include components due to stray light or radiation reflected within the unit 10. Also the high chopping frequency reduces 1/f noise which may appear in the radiation signals.

The size of the unit 10, if desired, can be reduced considerably by excluding the chopper 24. Signal components produced by ambient and stray radiation within the unit 10 and 1/f noise would then need to be suppressed by appropriate filtering circuitry or other means.

The detection unit 10 includes a temperature and optical sensor circuit 30, which measures the temperature of the radiation emitted from the chopper 24 so as to provide a reference for converting received atmospheric radiation intensities to corresponding brightness temperatures. The circuit 30 also is responsive to light received from a light source 32 to generate a synchronising signal for use by the synchronous detector. The blades 26 and 27 of the chopper 24 pass between the light source 32 and the circuit 30 so as to intermittently prevent the circuit 30 receiving light from the source 32. The synchronising signal enters one state when light from the source is received and another state when a blade 26 or 27 is disposed between the source 32 and the circuit 30.

Figure 5:
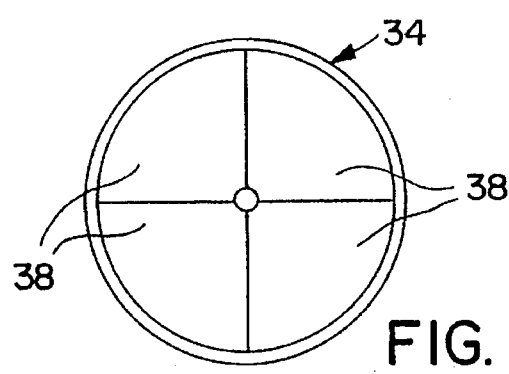
FIG. 5 is a plan view of a filter wheel of the system.

The received radiation after being reflected by the reflector 20 is filtered by a quadrant 38 of a filter wheel 34, as shown in FIGS. 3 and 5, before the radiation 18 is incident on the array 22. The filter wheel 34 is connected and rotated by a filter wheel motor 36 and the wheel 34 completes a revolution every second. The quadrants 38 of the wheel 34 each include a respective infrared filter for one of the four wavelengths of interest. The filters of the quadrant 38 only allow the wavelength corresponding thereto to pass through the quadrant 38. The quadrants 38 are rotated from the path of the radiation 18 so as to position the succeeding quadrant 38, every 0.25 seconds. The array 32 therefore generates modulated signals representative of one of the four wavelengths every 0.25 seconds and the modulated signals can be considered to belong to one of four wavelength channels. The filter wheel 34 and motor 36 could, of course, be omitted and replaced by appropriate filtering circuitry or other means which would extract the channel signals from signals representative of the broad infrared band received.

Figure 6:
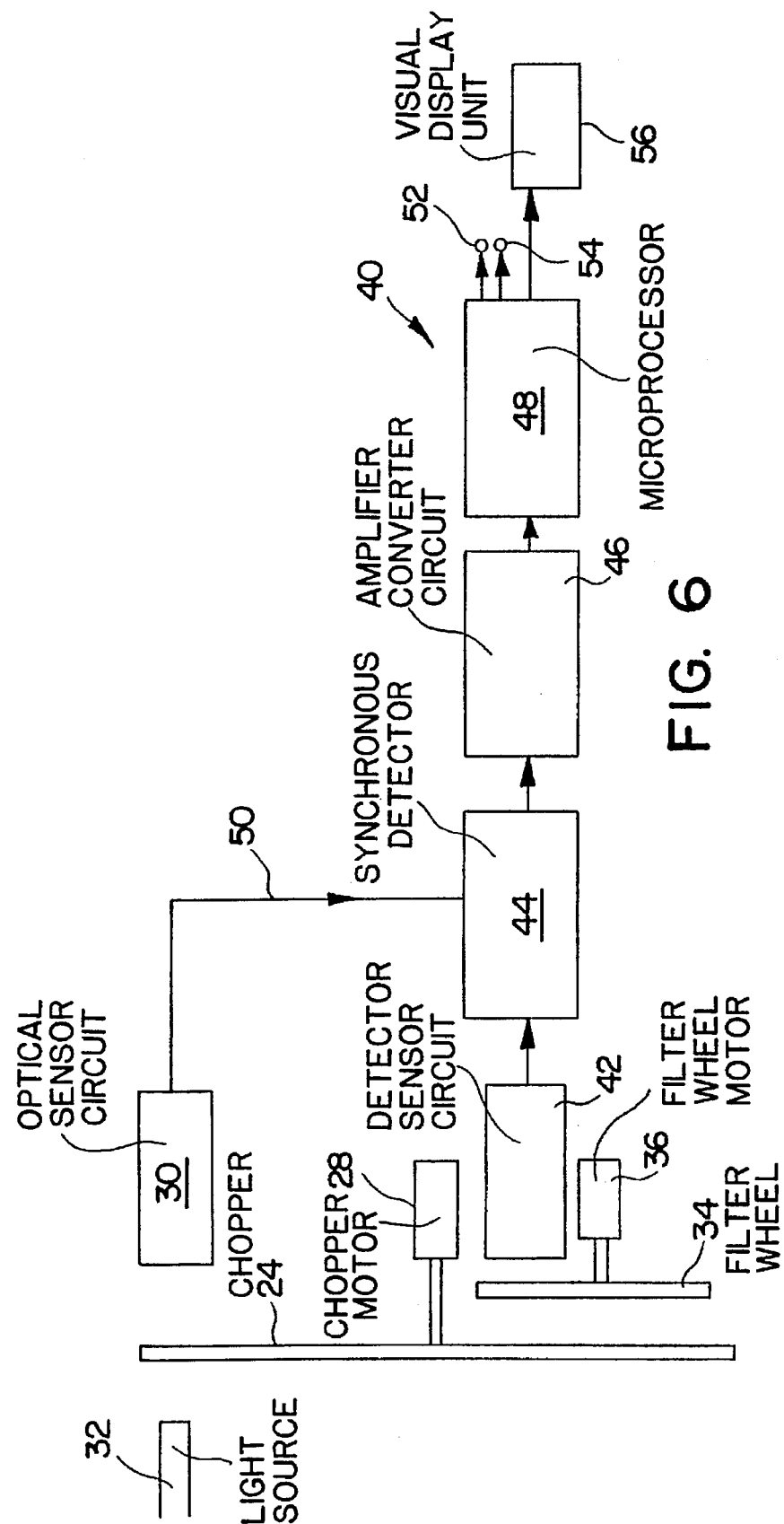
FIG. 6 is a block diagram of the electrical/electronic circuitry of the system.

A signal processing circuit 40 for processing the modulated signals is housed in the casing 12, as shown in FIGS. 3 and 4, together with the optical and mechanical components of the detection unit 10. The processing circuit 40, as shown in FIG. 6, includes a detector sensor circuit 42, a synchronous detector 44, an amplifier converter circuit 46 and a microprocessor 48. The sensor circuit 42 includes the detector array 22 and passes the modulated signals generated by each array element for each wavelength channel, to the synchronous detector 44. The detector 44 extracts the modulation envelope from the signals outputted by the sensor circuit 42, using the synchronising signal received on line 50 from the temperature and optical sensor circuit 30. The extracted envelopes represent the received infrared intensities for each element of the array 22 for the four channels. The amplifier converter circuit 46 amplifies the intensity signals and converts the signals to 256×256 digital pixels, each including values of radiation received for the four channels and corresponding to a respective array element. The pixels are then processed by the microprocessor 48 in accordance with a software routine, described hereinafter with reference to FIGS. 7 and 8, to determine whether the pixels indicate adverse atmospheric conditions are present ahead of the aircraft. If adverse conditions do exist, a warning lamp 52 and/or an audio warning signal 54 are activated in the cockpit of the aircraft to alert the pilot to the existence of the conditions. The microprocessor 48 then activates a visual display unit 56, also mounted within the cockpit, and supplies RGB signals, derived from the digital pixels, to the unit 56 so as to generate a display for the pilot which indicates the position of the adverse conditions relative to the aircraft.

Figure 7:
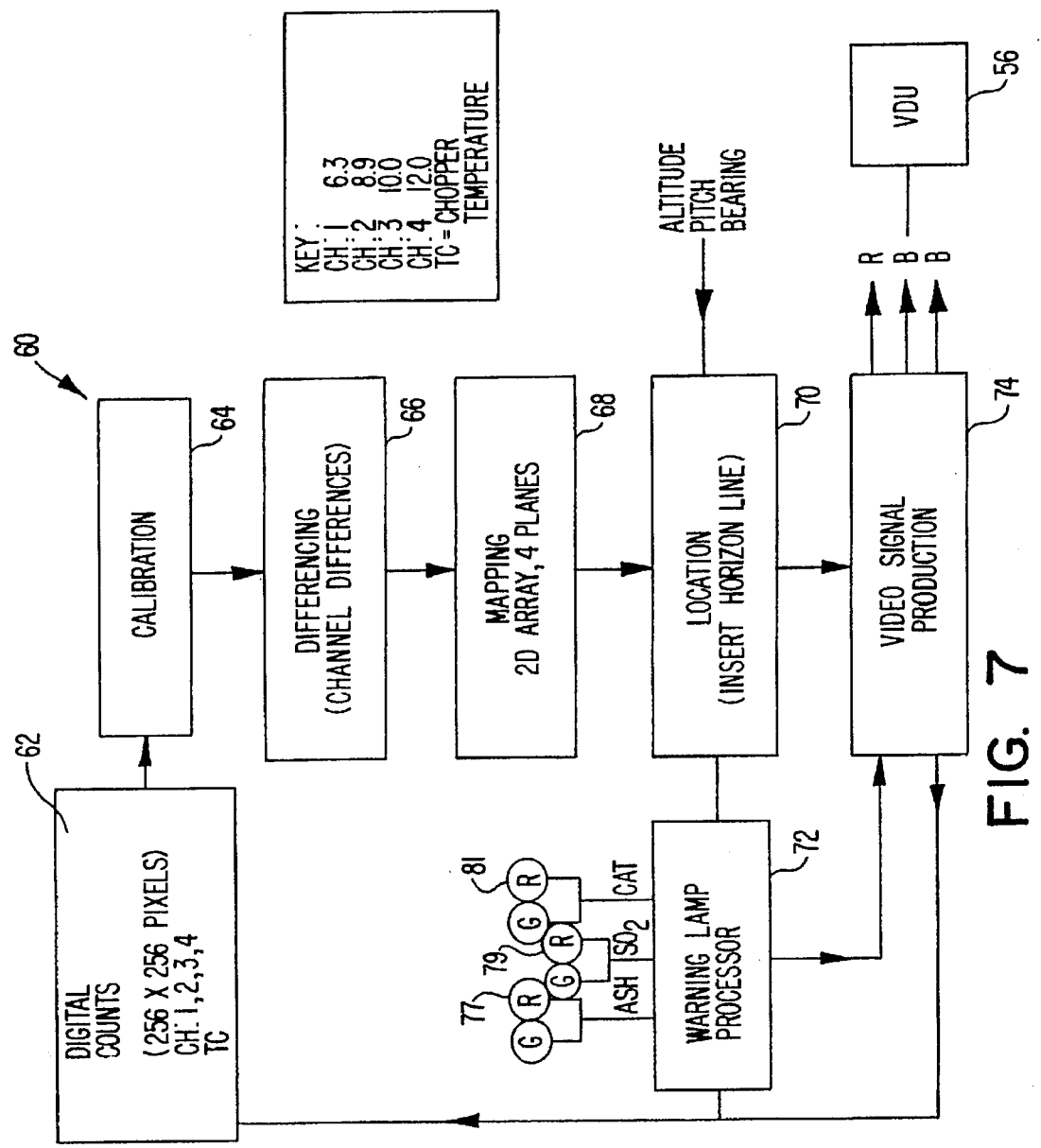
FIG. 7 is a flow diagram of a main operating routine of the system.

The main operating routine 60, as illustrated in FIG. 7 begins at step 62 where the digital pixels are received by the microprocessor 48. The four channels can be designated channel 1 for the 6.3 µm wavelength channel, channel 2 for the 8.6 µm wavelength channel, channel 3 for the 10.0 µm wavelength channel, and channel 4 for the 12.0 µm wavelength channel. The microprocessor 48 also receives a signal representative of the chopper temperature, TC, via the line 50, detector 44 and converter circuit 46. Next, at a calibration step 64, the intensity values of the pixels are converted to corresponding brightness temperature values using predetermined calibration values, the chopper temperature TC and the chopper radiation intensity received as a reference. The calibration step 64 produces respective brightness temperature values T1, T2, T3, T4 for the four channels for each pixel. The routine 60 then proceeds to step 66 where differences between channel temperatures are calculated, as required, and then at step 68, the array of pixels are rearranged so they can be used to produce a display for the pilot which is orientated to correspond with the view that the pilot has from the aircraft. For instance, the infrared image received by the detector array 22 may be inverted with respect to the view the pilot has from the cockpit and the arrangement of the pixels representative of the image would need to be inverted before being used to display the image.

After the pixels have been mapped to a desired orientation at step 68, information concerning position of the horizon line is inserted in the pixel array at step 70. The position of the horizon line is determined at step 70 on the basis of altitude, pitch and bearing signals received by the microprocessor 48 from the cockpit. The pixels are then analysed in a warning lamp processor routine 72 and used in a video signal production step 74. The warning lamp processor routine 72 analyses pixel arrays to determine whether an ash cloud, sulphur dioxide or clear air turbulence is present ahead of the aircraft and activates respective warning lamps 77, 79 and 81, accordingly. At the video signal production step 74, selected values of the pixels are used to generate Red, Green and Blue (RGB) signals which are supplied to the video display unit 56. How the temperature values are used to generate the RGB signals depends on the result of the analysis by the warning lamp processor routine 72. For example, if the difference between the temperature of the fourth channel and that of the third channel is negative the value of the difference is used to generate a Red signal at step 74 of the routine 60, whereas if the difference is positive the value of the difference is used to produce a Green signal. If, however, there is no difference between channels three and four for the pixel, and the value of channel four indicates a cloud is not present, the value of channel four is used to generate a Blue signal, whereas if the value indicates a cloud is present, the value is used to generate a Red Green and Blue signal, together so as to produce a black colour on the display 56. The display unit 56 also may only be activated when an alarm condition occurs. After steps 72 and 74, the routine 60 proceeds back to step 62.

Figure 8:
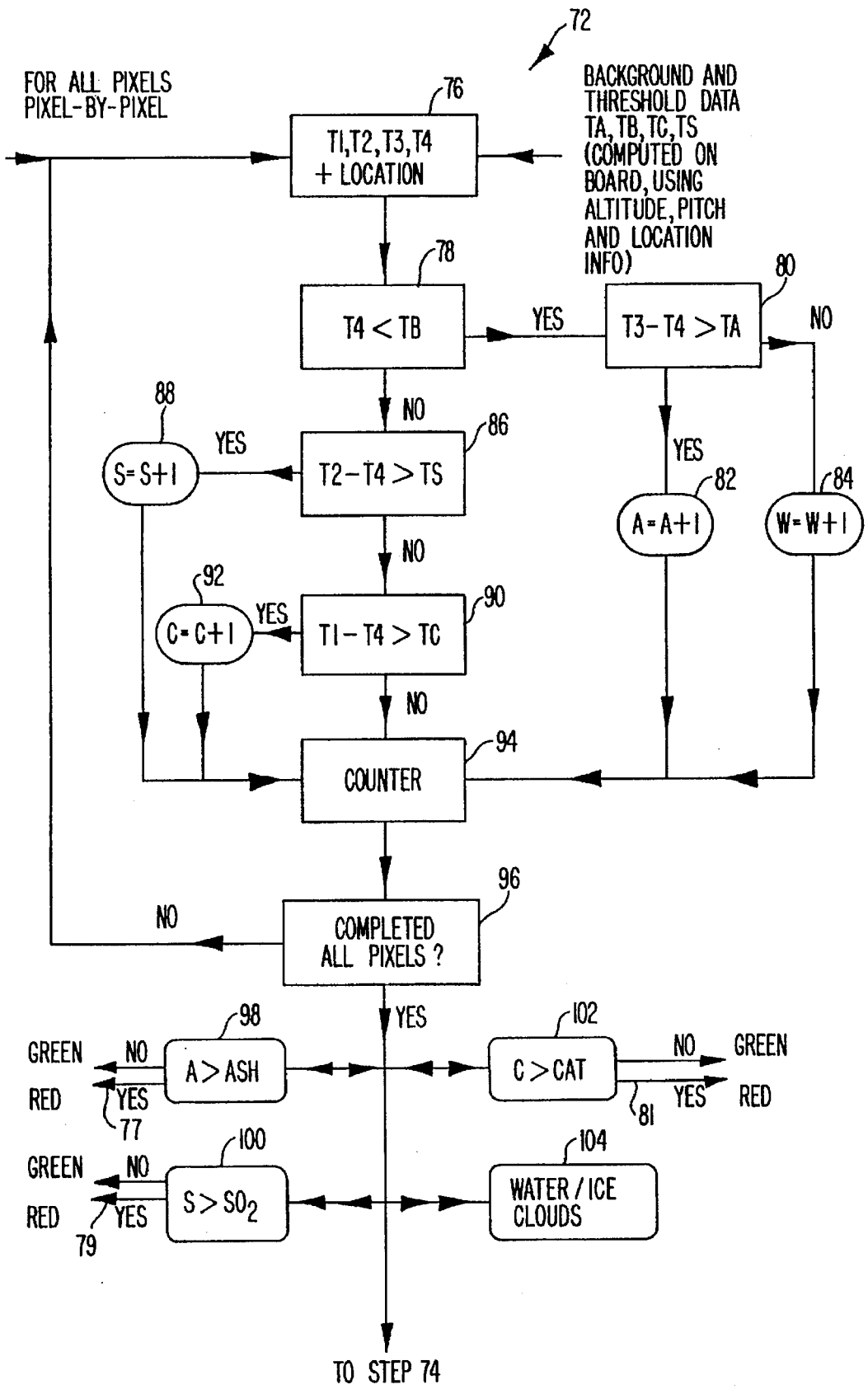
FIG. 8 is a flow diagram of a warning lamp processor routine of the system.

The pixels of the array are analysed consecutively by the warning lamp processor routine 72, as shown in FIG. 8. The routine 72 begins at step 76 where the brightness temperatures are extracted from the current pixel and a previously stored brightness temperature TB for the background 8 is retrieved, together with threshold values for the detection of an ash cloud, sulphur dioxide gas, and clear air turbulence, TA, TS, TC, respectively. The threshold values in a number of instances would be approximately 0. The temperature TB and the threshold values TA, TS and TC are determined by the microprocessor 48 on the basis of information concerning the position and orientation of the aircraft, such as altitude, pitch and latitude.

The routine 72 then proceeds to step 78 where a comparison is made between the temperature of the fourth channel and the background temperature. If T4 is less than TB this indicates the pixel corresponds to a cloud and the routine 72 proceeds to step 80 where the difference between the temperatures of the third and fourth channels is compared with the ash threshold TA. If the difference is greater than TA an Ash count is incremented at step 82, otherwise an ice/water count W is incremented at step 84.

If the pixel is determined at step 78 not to relate to a cloud, the routine 72 proceeds to step 86 where the difference between the brightness temperature of the second channel and the fourth channel is compared with the sulphur dioxide threshold TS. If T2–T4>TS this indicates the atmosphere corresponding to the pixel contains sulphur dioxide particles and a sulphur dioxide counter S is incremented at step 88. If the comparison at step 86 does not prove positive, a comparison is made at step 88 with respect to the difference between the temperature of the first channel and the temperature of the fourth channel and the clear air turbulence threshold TC. If T1–T4>TC, this indicates the atmosphere corresponding to the pixel includes clear air turbulence and a clear air turbulence counter C is incremented at step 92.

After steps 88, 92, 90, 82 and 84, the routine proceeds to a step 94 where the values of the counts are examined to determine if any anomalies exist, such as a count exceeding the total number of pixels for an array and then at step 96, a check is made to see if all of the pixels of an array have been processed. If all of the pixels have not been processed, the routine 72 proceeds to step 76, otherwise the routine executes four decision steps 98, 100, 102 and 104. At step 98, if the ash count A exceeds an ash cloud existence threshold, a volcanic ash cloud exists ahead of the aircraft and a corresponding red warning lamp 77 is illuminated in the cockpit to alert the pilot. Similarly, at steps 100 and 102, if the sulphur dioxide and clear air turbulence counts S and C exceed corresponding existence thresholds, corresponding red warning lamps 79 and 81 are illuminated in the cockpit accordingly.

If one of the decision steps 98, 100 or 102 produces a positive result and a red warning lamp is illuminated, an activation flag is set and the routine 72 passes operation of the processor 48 to the video signal production step 74, and all of the counts A, W, S and C are reset. In response to the activation flag being set, the video display unit 56 is activated and a display generated, which provides the pilot with a visual representation of the location of the adverse condition detected relative to the aircraft. The display viewed by the pilot when a volcanic ash cloud 2 is present is similar to that illustrated in FIG. 1, where a horizontal line 9 will be placed across the display, the semi-transparent region 4 would appear in a shade of red and the centre region 6 appears black. The background 8 is coloured a shade of blue. As the pilot moves the aircraft relative to the cloud 2 to avoid the cloud the display is updated accordingly so as to show the pilot's movement away from the cloud 2.

The presence of sulphur dioxide gas, if detected, could also be displayed. However, detection of the gas would normally be used as confirmation that a volcanic ash cloud exists ahead of the aircraft. The clear air turbulence anomalies, when detected, are displayed on the visual display unit 56 as colour encoded variations in the intensity of the signals received on the 63 μm channel.

For adverse atmospheric conditions at a range of 100 km and with the aircraft travelling at an airspeed of 600 km/hour, the detection system provides approximately ten minutes warning to the pilot.

At step 104 of routine 74, a decision can be made as to whether the state of the ice/water count W indicates a cloud ahead of the aircraft is a water/ice cloud and a display of the cloud can be provided if desired. The cloud would be displayed in a similar manner to a volcanic ash cloud, as described above, except the semi-transparent region 4 would appear green. To indicate the system is functioning correctly a series of green lamps are provided for each adverse condition capable of being detected. The green lamps are illuminated if none of the adverse conditions are present ahead of the aircraft.

Figure 9:
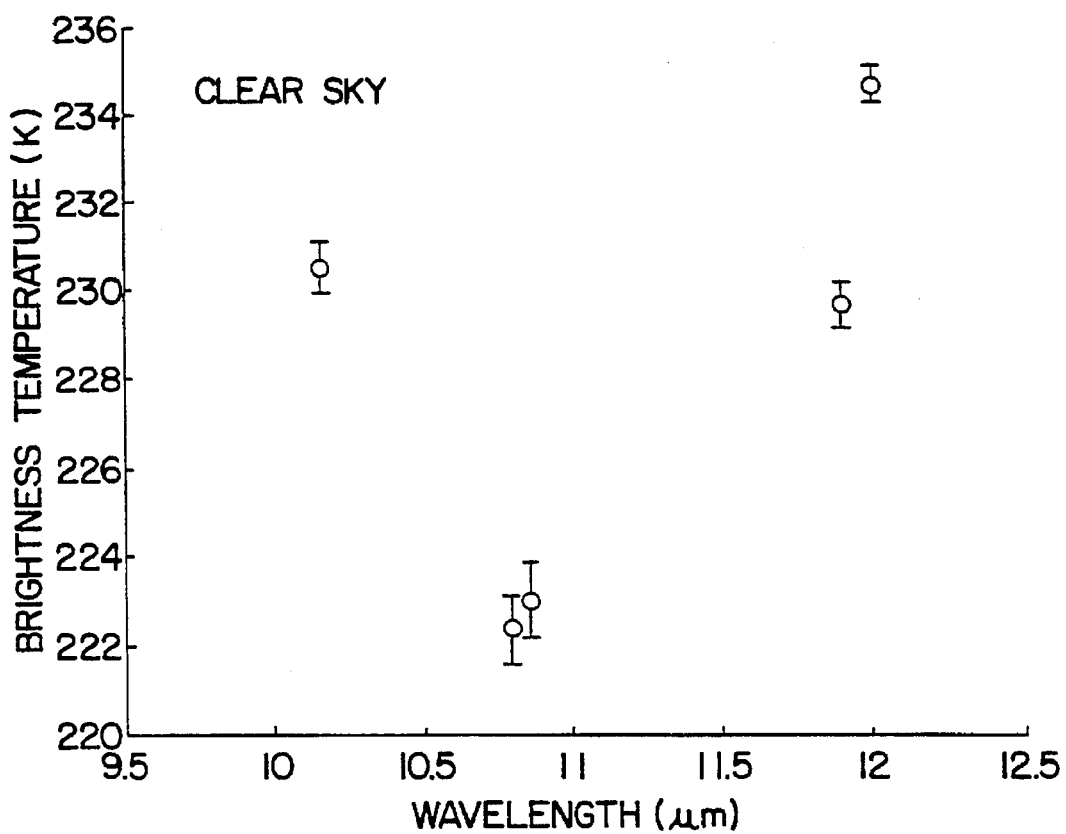
FIGS. 9 and 10 are graphs of infrared radiation received vs infrared wavelength for clear sky and cumulus cloud, respectively.
Figure 10:
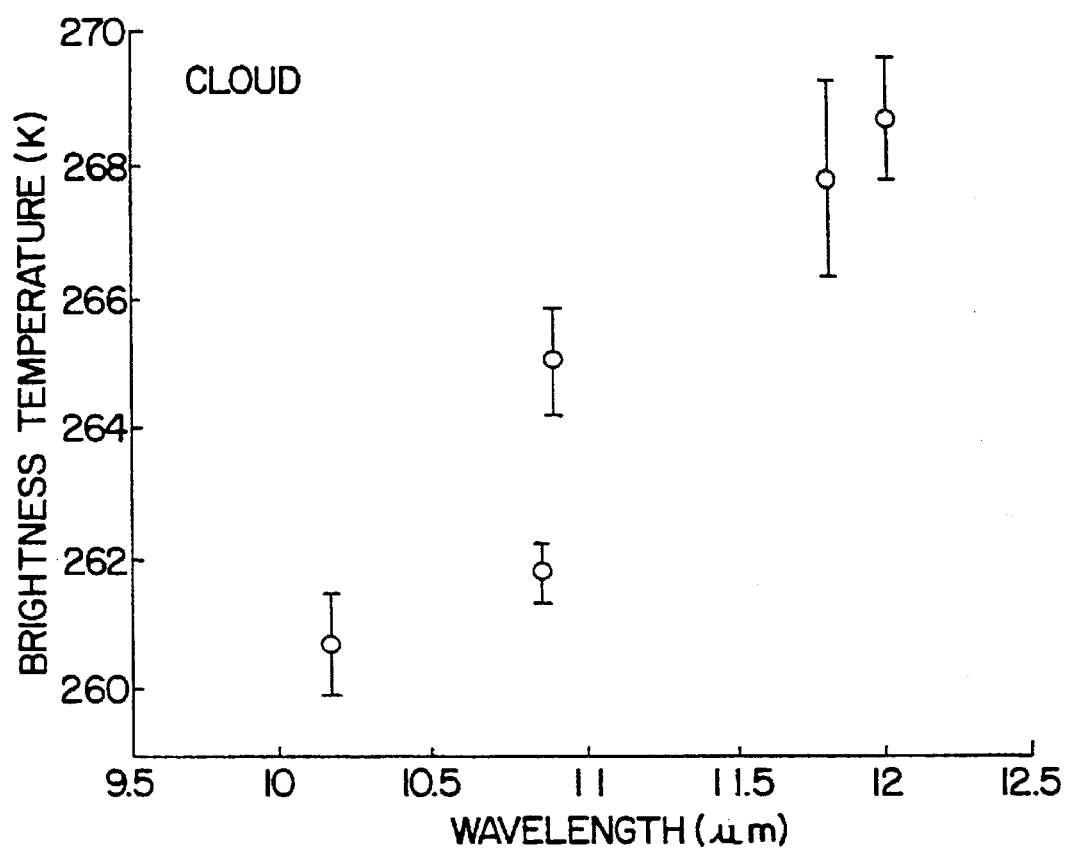

A detection unit similar to the detection unit 10 described above was placed in an aircraft and tested during 8 to 14 Dec. 1990 over Hobart in the State of Tasmania. The unit was placed in the port wing of the aircraft and mounted so as to receive radiation in front of the aircraft. At an altitude of 12000 feet the aircraft was directed to view horizontally clear sky and then at 10000 feet was directed to view horizontally a cumulus cloud. Readings were obtained by the unit over a 10 to 12 μm wavelength range as illustrated in FIGS. 9 and 10. The data points represent an average of 5 to 10 seconds of data received and the error bars represent the standard deviations about the means. FIG. 9 illustrates the radiation received from the clear sky which was seen to decrease from 10.2 μm to minimum near 10.8 μm and then again increase towards 12.0 μm. The warmer sky at 10.2 μm is due to radiation received from a warm band of ozone centred at 9.6 μm. The radiation received from the cumulus cloud is illustrated in FIG. 10 and shows the cloud appears to be warmer at longer wavelengths. The two examples demonstrate that a detection unit 10 directed horizontally towards clear and/or cloudy skies experiences a marked increase in radiation received from the 10.8 μm to 11.9 μm wavelengths.

Figure 11:
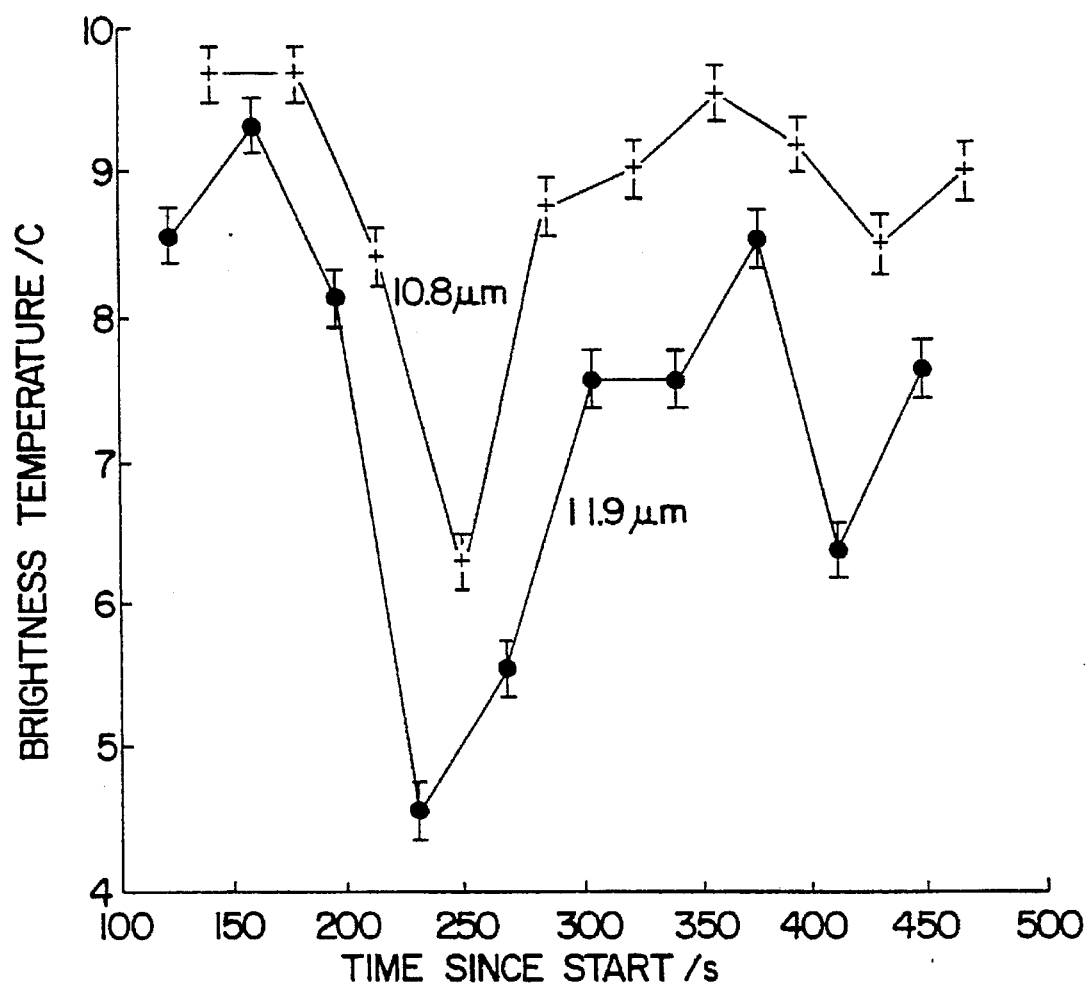
FIGS. 11 to 13 are graphs of infrared radiation received vs time for volcanic ash clouds and different infrared wavelengths.
Figure 12:
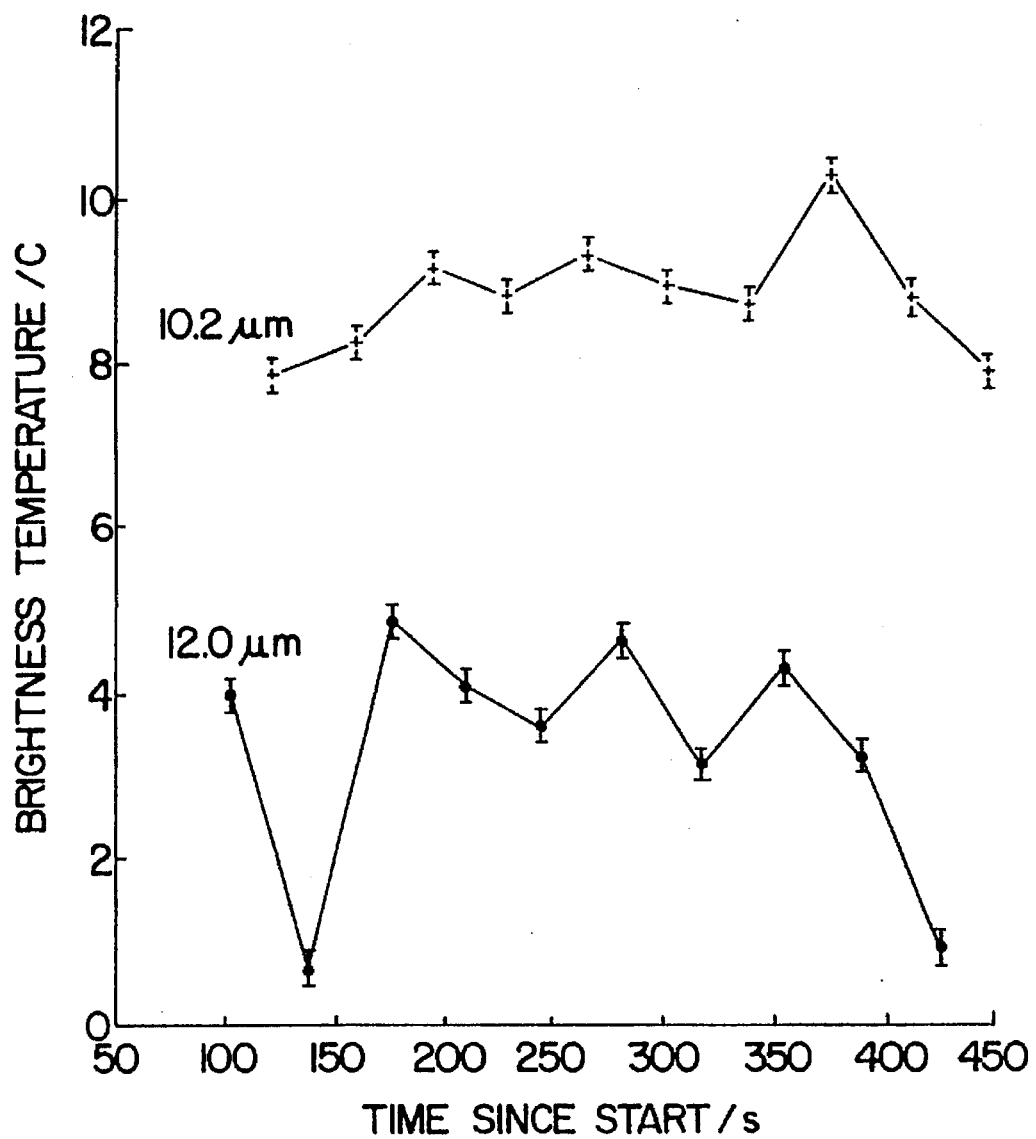
Figure 13:
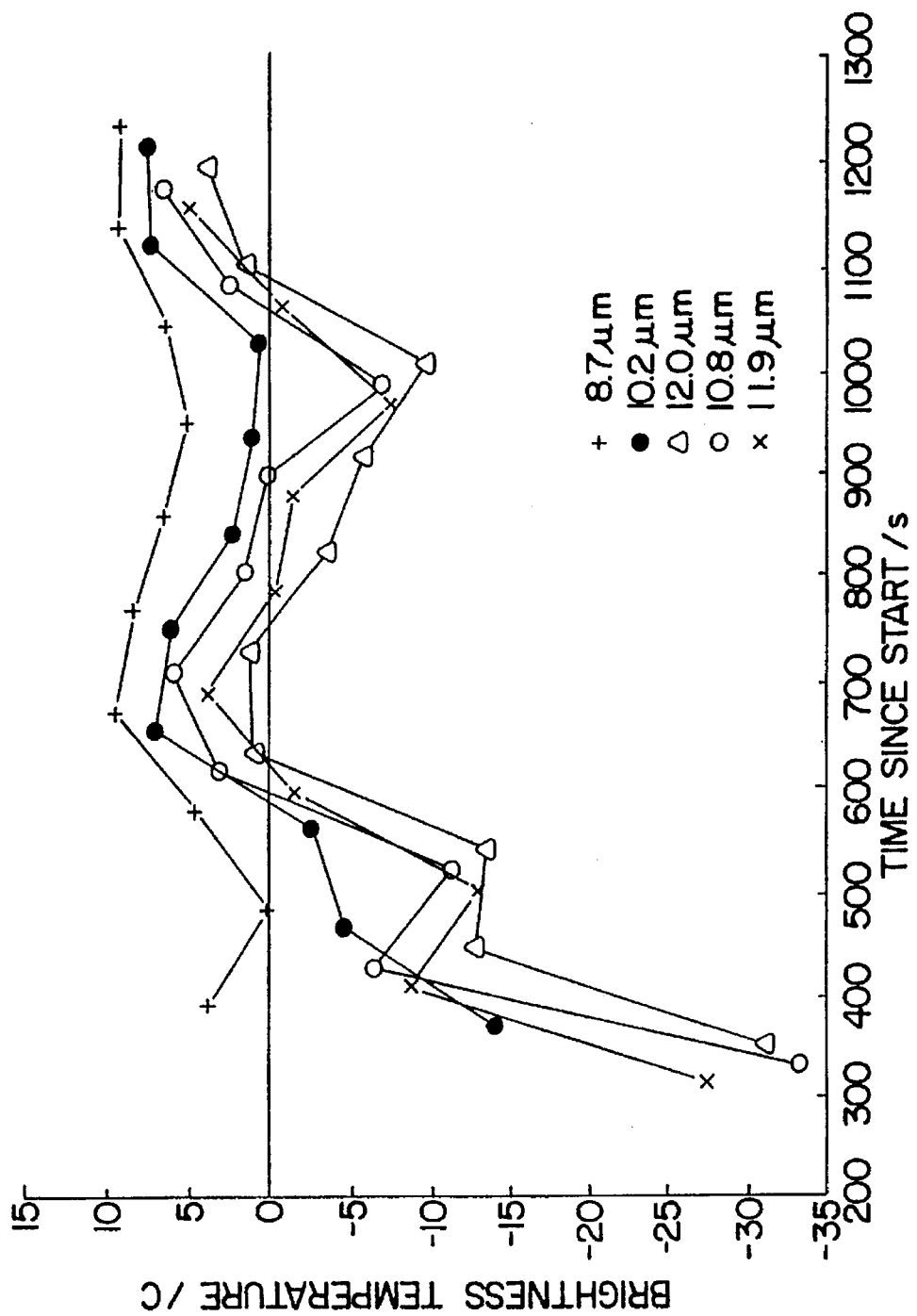
Figure 14:
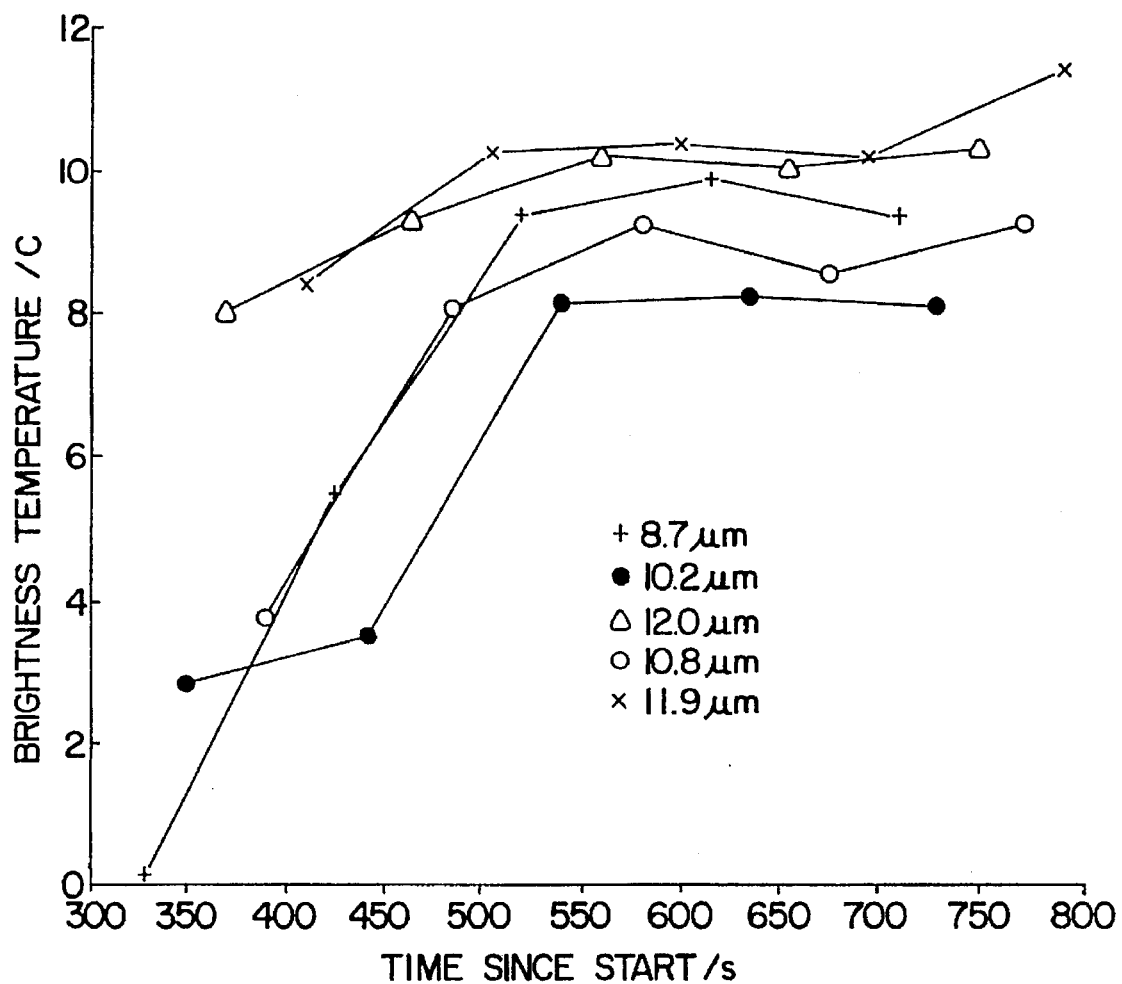
FIG. 14 is a graph of infrared radiation received vs time for a water cloud and different infrared wavelengths.

Between 3 and 18 Mar. 1991, another detection unit, similar to the detection unit 10 described previously, was tested at the Sakurajima Volcanological Observatory (SVO), Arimura, Mt Sakurajima on the south Japanese island of Kyushu. The unit was mounted for ground based viewing of volcanic ash clouds produced by eruptions from the Mt Sakurajima volcano. The detection unit was mounted to view the ash clouds substantially horizontally and at various elevations and Azimuth angles, in a similar manner as the clouds would be viewed ahead of an aircraft in flight. The results are illustrated in FIGS. 11 to 14 and the heading of each Figure indicates the local time at the start of the measurement cycle, the date, the location, the type of cloud being viewed, the elevation angle (El in degrees) and the Azimuth angle (Az in degrees) of the detection unit. FIG. 11 shows the brightness temperatures corresponding to infrared radiation received at 10.8 μm and 11.9 μm from a volcanic cloud approximately 3 km away. The brightness temperature at 10.8 μm is clearly greater than that at 11.9 μm. The volcanic cloud was laden with ash. A second example is illustrated in FIG. 12 for a dispersed volcanic cloud. Brightness temperatures were obtained for the 10.2 μm and 12.0 μm wavelengths and again the brightness temperatures for the shorter wavelength were distinctly greater than those for the longer wavelength. The detection of sulphur dioxide to confirm the presence of a volcanic ash cloud was also tested and FIG. 14 shows brightness temperatures as a function of time for five infrared wavelengths whilst the detection unit was used to view a water cloud. The wavelengths examined included 8.7, 10.2, 12.0, 10.8 and 11.9 μm. For the water cloud, it is clear that the brightness temperature at 8.7 μm is lower than that at 11.9 or 12.0 μm. Whereas when viewing a volcanic ash cloud the brightness temperature at 8.7 μm is greater than the signals for all of the other channels, as indicated by the results illustrated in FIG. 13. The enhanced signal at 8.7 μm is due to emission from sulphur dioxide and this was confirmed by measurements taken at the same time from a correlation spectrometer, which indicated that there was large amounts of silicon dioxide in the Mt Sakurajima volcanic clouds.

The Japanese tests described above clearly demonstrated that a detection unit 10 directed substantially horizontally towards volcanic ash clouds experiences a marked decrease in radiation received from the 10.2 μm to the 12.0 μm wavelengths, and that the 8.7 μm channel can be used to detect the presence of sulphur dioxide.

We claim:

1. A detection system including means for monitoring infrared radiation received from above the horizon, means for generating signals representative of said radiation, and processing means for determining the presence of a cloud including silicate bearing minerals on the basis of said signals, wherein said signals are representative of different predetermined wavelengths of said radiation, and said processing means is adapted to compare the signals of at least two of said predetermined wavelengths and generate a cloud warning signal if the results of the comparison indicate a cloud including silicate bearing minerals is present, wherein said warning signal is generated when said signals indicate the radiation received of a longer predetermined wavelength is less than the radiation received of a shorter predetermined wavelength, and wherein said monitoring means includes an infrared detector array and said signals relate to pixels of said array, such that said signals of each of said predetermined wavelengths correspond to each one of said pixels and said processing means generates display signals representative of the position of said cloud relative to said system on the basis of said signals and position signals representative of the position of said system.

2. A detection system as claimed in claim 1, wherein said processing means executes said comparison for each of said pixels and a count is adjusted when the difference between the levels of said signals, corresponding to a respective pixel, of said longer wavelength and said shorter wavelength is negative, and said warning signal is generated when said count passes a predetermined threshold.

3. A method of detecting an adverse atmospheric condition, including:

monitoring infrared radiation received from above the horizon;

generating signals representative of said radiation; and determining if an adverse atmospheric condition, comprising at least the presence of a cloud including silicate bearing minerals, is present on the basis of said signals.

4. A method as claimed in claim 3, wherein said signals are representative of different predetermined wavelengths of said radiation and said method includes comparing the signals of at least two of said predetermined wavelengths and generating an adverse atmospheric condition warning signal if the result of said comparison indicates said adverse condition is present.

5. A method as claimed in claim 4, wherein said warning signal is generated if said signals indicate radiation received of a longer predetermined wavelength is less than radiation received of a shorter predetermined wavelength.

6. A method as claimed in claim 5, wherein said wavelengths fall within the range of approximately 10 to 12 µm.

7. A detection system, including means for monitoring infrared radiation received from above the horizon, means for generating signals representative of predetermined wavelengths of said radiation, and processing means for determining on the basis of said signals if an adverse atmospheric condition is present and generating a warning signal when said condition is present, characterized in that:

said processing means is adapted to determine on the basis of said signals if said adverse atmospheric condition, comprising a cloud including volcanic ash cloud constituents, is present, wherein said processing means determines said cloud is present if said signals indicate radiation received of a longer wavelength is less than radiation received of a shorter wavelength, wherein said predetermined wavelengths fall within the range of approximately 10 to 12 µm, and wherein said monitoring means includes an infrared detector array and said signals relate to pixels of said array, such that said signals of each of said wavelengths correspond to each one of said pixels, and said processing means generates display signals representative of the position of said adverse atmospheric condition relative to said system on the basis of said signals and position signals representative of the position of said system.

8. A detection system as claimed in claim 7, wherein said processing means executes a comparison between said signals for each of said pixels and a count is adjusted when the difference between the levels of said signals, corresponding a respective pixel, of said longer wavelength and said shorter wavelength is negative, and said warning signal is generated when said count exceeds a predetermined threshold.

9. A method of detecting an adverse atmospheric condition, including monitoring infrared radiation received from above the horizon, generating signals representative of predetermined wavelengths of said radiation, determining on the basis of said signals if an adverse atmospheric condition is present and generating a warning signal when said condition is present, characterized by:

determining on the basis of said signals if said adverse atmospheric condition, comprising a cloud including volcanic ash cloud constituents, is present, wherein said monitoring step involves using an infrared detector array and said signals relate to pixels of said array, such that said signals of each of said wavelengths correspond to each one of said pixels, and display signals representative of the position of said adverse condition relative to an object are generated on the basis of said signals and position signals representative of the position of said object.

10. A method as claimed in claim 9, wherein the adverse atmospheric condition also comprises the presence of a high density of sulphur dioxide gas or clear air turbulence.

11. A method as claimed in claim 9 or 10 including generating information which indicates the position of said adverse atmospheric condition so the adverse condition can be avoided.

12. A method as claimed in claim 11, including generating a display which indicates the position of said adverse atmospheric condition.

13. A method as claimed in claim 9, wherein said cloud is present if said signals indicate radiation received of a longer wavelength is less than radiation received of a shorter wavelength.

14. A method as claimed in claim 9, wherein said wavelengths fall within the range of approximately 10 to 12 µm.

15. A method as claimed in claim 9, wherein a comparison of said signals is performed for each of said pixels and a count is adjusted when the difference between the levels of said signals, corresponding to a respective pixel, of said longer wavelength and said shorter wavelength is negative, and said warning signal is generated when said count exceeds a predetermined threshold.

16. A method as claimed in claim 13, wherein said longer wavelength and said shorter wavelength, which relate to the detection of a cloud including volcanic ash cloud constituents, are approximately 12 µm 10 µm respectively.

17. A method as claimed in claim 16, wherein said predetermined wavelengths include approximately 9 µm which relates to the detection of sulphur dioxide.

18. A method as claimed in claim 16, wherein said predetermined wavelengths include approximately 6 µm which relates to the detection of clear air turbulence.

19. A method as claimed in claim 18, including generating a clear air turbulence warning signal, when said signals indicate a cloud is not ahead of said aircraft, on the basis of a comparison between radiation received for said 6 µm wavelength and radiation received for said 12 µm wavelength.

20. A method as claimed in claim 12, wherein said display is generated when said cloud is present.

* * * * *

UNITED STATES PATENT AND TRADEMARK OFFICE
CERTIFICATE OF CORRECTION

PATENT NO. : 5,654,700
DATED : August 5, 1997
INVENTOR(S) : Prata et al.

It is certified that error appears in the above-identified patent and that said Letters Patent is hereby corrected as shown below:

In column 5 at line 39, please delete " the " (second occurrence).

In column 6 at line 45, please delete " 48, " and insert -- 48. --.

Signed and Sealed this

Twenty-sixth Day of May, 1998

BRUCE LEHMAN

*Attest:*

*Attesting Officer*  *Commissioner of Patents and Trademarks*